United States Patent [19]

Weinstein et al.

[11] 4,265,646
[45] May 5, 1981

[54] FOREIGN PARTICLE SEPARATOR SYSTEM

[75] Inventors: Barry Weinstein, Georgetown; William Steyer, Ipswich, both of Mass.

[73] Assignee: General Electric Company, Lynn, Mass.

[21] Appl. No.: 80,854

[22] Filed: Oct. 1, 1979

[51] Int. Cl.³ ............................................. B01D 39/00
[52] U.S. Cl. .................... 55/306; 60/39.09 P; 244/53 B
[58] Field of Search ............ 55/306; 60/262, 39.09 P; 244/53 B

[56] References Cited

U.S. PATENT DOCUMENTS

| 3,348,379 | 10/1967 | Wilde et al. | 60/262 |
|---|---|---|---|
| 3,362,155 | 1/1968 | Driscoll | 55/306 |
| 3,766,719 | 10/1973 | McAnally | 55/306 |
| 3,811,254 | 5/1974 | Amelio | 55/306 |
| 3,832,086 | 8/1974 | Hull et al. | 55/306 |
| 4,002,024 | 1/1977 | Nye et al. | 60/39.09 P |
| 4,175,384 | 11/1979 | Wagenknecht | 60/262 |

FOREIGN PATENT DOCUMENTS

| 854879 | 8/1952 | Fed. Rep. of Germany | 60/262 |
|---|---|---|---|
| 2605653 | 8/1976 | Fed. Rep. of Germany | 60/262 |

*Primary Examiner*—Bernard Nozick
*Attorney, Agent, or Firm*—Henry J. Policinski; Derek P. Lawrence; Donald W. Walk

[57] ABSTRACT

A system of separating or removing foreign particles from the gaseous fluid flowing in the primary flow path of a gas turbine engine is provided wherein the particles are removed from the stream near the engine inlet and flow through a conduit to ejector means operative to effect a flow of a second stream of fluid in the conduit. Mixing means are provided for mixing the second stream of fluid with the gaseous fluid flowing in the primary flow path.

6 Claims, 3 Drawing Figures

FOREIGN PARTICLE SEPARATOR SYSTEM

BACKGROUND OF THE INVENTION

This invention relates to a gas turbine engine and, more particularly, to system for removing or separating foreign particles from the gaseous fluid flowing in the primary flow path of a gas turbine engine.

Gas turbine engines, particularly turboshaft gas turbine engines associated with helicopters, are susceptible to ingesting foreign particles. The tendency is associated with the variety of harsh environments in which the vehicle operates. Sand from deserts, salt from oceans and foliage from tropical environments are all potentially harmful to the engine and may deteriorate its performance.

The problems posed by ingestion of foreign particles into a gas turbine engine have been well known and attempts have been made previously to provide means for separating out foreign particles before the gaseous fluid, namely air, is supplied to the internal sections of the engine. One prior art approach which has proved to be particularly adept at this task is the particle separator and scroll scavenging means described in U.S. Pat. No. 3,832,086. The particle separator described in this patent imparts a radial velocity component to the particles in a direction away from the internal compressor air flow entrance. The particles are directed away from the compressor entrance and into a collection chamber. A blower is provided for establishing a vacuum which sucks the particles out of the collection chamber. This particle separation system has generally proved to be satisfactory in preventing damage to the internal engine components. However, the use of a blower to establish the vacuum for removing the particles from the collection chamber has added weight and cost to the system. Additionally, the blower must be periodically serviced, repaired and otherwise subjected to maintenance procedures which introduce additional expense in operating the engine.

Another prior art particle separator system, described by U.S. Pat. No. 3,766,719, provides suction for removing the particles from the separator collection chamber by permitting engine exhaust gases to flow past a nozzle connected by conduits to the collection chamber. A nozzle used in this manner is known as an ejector. The ejector depicted in this referenced patent discharges the stream of air in a direction generally parallel to the exhaust gases flowing in the main flow path. With parallel discharge, the ejector air stream and the exhaust gases are not immediately mixed and the exhaust duct of the engine must extend substantially downstream of the location at which the ejector is disposed to the exhaust gases in order to permit the two air streams to coalesce and generate a sufficient vacuum. With the ejector disposed downstream of the exit diffuser of the engine, the potential amount of generated vacuum is limited and the exhaust duct must be lengthened considerably in order to generate vacuum. Disposing the ejector upstream of the diffuser still requires the use of a duct extension ahead of the diffuser since the diffuser will not expand and decelerate the fluid stream unless the suction air is well coalesced with the mainstream gases. In either instance the use of an extended length of duct, to provide sufficient ejector suction, increases the cost, weight and length of the engine. Since the duct requires little or no servicing, this approach avoids the expenses related to maintaining a blower. However, the extra weight and costs associated with the extended duct are still undesirable characterics. Furthermore, the additional increases in overall length of the engine, due to the additional duct length, may itself make the engine unsuitable for vehicle applications having limited engine space requirements.

SUMMARY OF THE INVENTION

Therefore, it is an object of the present invention to provide a foreign particle separator system for a gas turbine engine.

It is another object of the present invention to provide a foreign particle separator system having an ejector wherein the system is compatible with engine requirements of low weight, high reliability and compact length.

Briefly stated, these and other objects and advantages, which will become apparent by the following description of the preferred embodiment read in conjunction with the appended drawings, are accomplished by the present invention which, in one form, provides an inlet particle separator system for use in a gas turbine engine having an inlet, a compressor, a combustor and a turbine operatively connected to form a primary flow path in which a gaseous flowing stream of fluid is compressed, combusted and expanded. The system provides means disposed near the engine inlet for removing foreign particles from the primary flow path. Conduit means connect the separating means to ejector means operative to effect a flow of a second gaseous stream of fluid in the conduit for drawing foreign particles through the conduit and away from the separating means. Mixing means are disposed downstream of the turbine and are connected to the conduit means for receiving the second stream of fluid and for mixing the second stream with the stream of fluid flowing in the primary flow path. The ejector means may be operative in response to the expanded stream of fluid and may include first and second ejectors operative, respectively, in response to the expanded stream of fluid and the compressed stream of fluid.

DESCRIPTION OF DRAWINGS

While the specification concludes with claims distinctly claiming and particularly pointing out the invention described herein, the invention is more readily understood by reference to the description of the preferred embodiment along with the accompanying drawings in which:

DESCRIPTION OF THE PREFERRED EMBODIMENT

Figure 1:
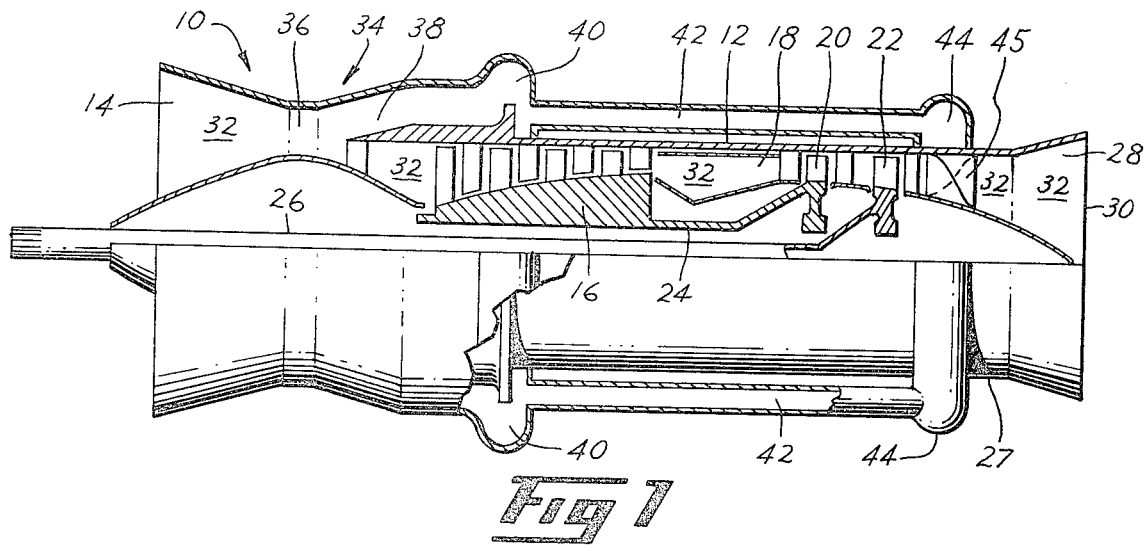
FIG. 1 depicts a schematic cut-away representation of a gas turbine engine including the foreign particle separator system comprising the present invention.

Referring now to FIG. 1, a schematic representation of a gas turbine engine, including the foreign particle separator system comprising the present invention, is depicted generally at 10. Engine 10 extends generally axially along engine centerline or axis X—X and includes a casing 12 open at its forward end to provide an annular inlet 14. The gaseous fluid or air entering engine 10 through inlet 14 passes sequentially through compressor 16, where the air is compressed, and, thence, to combustor 18 where the air is mixed with fuel and burned. The hot gases of combustion emerging at a high velocity from combustor 18 passes sequentially through high pressure turbine 20 and low pressure turbine 22 where the gases are expanded to extract energy therefrom. Energy extracted from the hot gases by turbine 20 provides the driving force for compressor 16 which is connected to turbine 20 by shaft 24. Energy extracted from the hot gases by turbine 22 provides the driving force for the main engine drive shaft 26 which delivers power to an energy using device, such as a helicopter rotor system, not shown. After exiting turbine 22 the hot gases of combustion pass through the engine exhaust duct 27 which includes a diffuser 28, in which the gases are expanded, and engine exit 30. It is observed that inlet 14, compressor 16, combustor 18, turbines 20 and 22 and diffuser 28 are operatively connected so as to form a primary annular flow path 32 through engine 10 from inlet 14 to exit 30. In flow path 32 the gaseous flowing stream of fluid is sequentially compressed, burned, expanded, diffused and exhausted to atmosphere. Since the general operation of gas turbine engine 10 is well known to others in the field, any further description of the general operation is believed to be unnecessary for a full and complete understanding of the present invention.

Means, in the form of inlet particle separator shown generally at 34, for removing foreign particles from primary flow path 32, is operatively disposed between inlet 14 and compressor 16. Air passing through inlet 14 will encounter a radially outward bend in the flow path 32 generally at location 36. The radially outward bend in flow path 32 will cause the air stream, including foreign particles entrained in the stream to be directed partially in a direction radially outward from engine centerline X—X. Immediately downstream of location 36, the primary flow path 32 turns sharply radially inward toward centerline X—X. The air in the stream will turn radially inward to follow the flow path 32. However, the particles, being heavier than the air in the stream, and having considerable momentum, will continue to travel radially outwardly.

Separator 34 further includes a circumferentialy and axially extending annular passageway 38 leading from the primary flow path 32 immediately downstream of location 36 to an annular circumferentially extending collection chamber 40. Particles propelled radially outwardly by the aforementioned radially outward bend in flow path 32 as herein before described, will enter passageway 38 and will be deposited in collection chambers 40. Conduit means, in the form of a pair of conduits 42, in fluid communication with collection chamber 40 of particle separator 36 extend axially downstream to circumferentially extending manifold 44.

Figure 2:
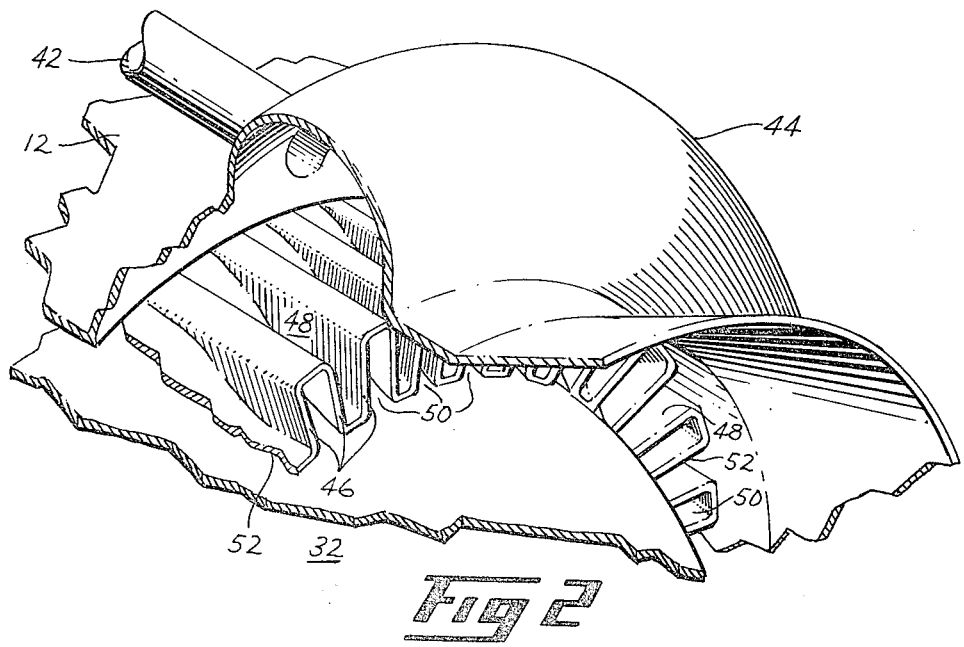
FIG. 2 depicts an enlarged perspective view of a downstream portion of the engine depicted in FIG. 1.

Referring now to FIG. 2, there is depicted an enlarged perspective view of the downstream portion of engine 10. It is observed that mixing means, in the form of lobed mixer 45 disposed in flow path 32, is comprised of a corrugated construction. Mixer 45 includes a first plurality of axially and radially extending chutes 48 in fluid communication with manifold 44 interspersed between a second plurality of axially and radially extending chutes 50. The gaseous fluid flowing in primary flow path 32 passes through chutes 50. Ejector means, in the form of chute exits 46, are provided at the discharge or match plane of chutes 48 and 50. More specifically, careful selection of the exit plane area of chute exits 46, enables ejector action to be achieved. Generally, the selection of a specific exit plane area will depend upon the airflow characteristics of the particular gas turbine engine to which the present invention is applied.

The ejector means 46 is operative in response to the gaseous fluid flowing in primary flow path 32 to effect a flow of a second gaseous stream of fluid in conduits 42 for drawing particles through conduits 42 and away from separator 34. More specifically, gaseous fluid flowing in primary flow path 32 at a high velocity produces a low pressure at chute exits 46 whereby a flow of second gaseous stream in conduit 42 is effected. The principle of operation of ejector means 46 is the same as ejectors known in the art and hence a detailed explanation of its principles of operation are deemed not to be necessary for a full understanding of the present invention.

With chutes 48 interspersed between chutes 50 in the aforedescribed alternating fashion, a plurality of discrete rivulets emerging from chutes 48 are discharged between a plurality of discrete rivulets emerging from chutes 50. In this manner, the first and second fluid flows are mixed at the match plane at the most downstream extent of mixer 45. However, the presence of mixer 45 further promotes additional mixing downstream of the match plane. More specifically, the long undulating perimeter 52 of the mixer 45 at the match plane provides a large boundary interface, and large total shear forces, between adjacent rivulets. Due to the large shear forces introduced by the large perimeter 52, appropriate mixing between adjacent rivulets is accomplished in a minimum of time and distance during flow downstream from mixer 45.

Mixing, in the aforedescribed manner, of the gaseous fluid flowing in the primary flow path 32 with the second stream of fluid effected by ejector 46, permits the length of the engine exhaust duct 27 to be shorter than exhaust ducts heretofore known in the prior art. More specifically, the diffuser section 28 of exhaust duct 27 will perform a diffusing function with acceptable efficiency only if the gaseous fluid flowing therethrough has substantially uniform profiles of velocity, pressure and temperature. The mixer 45 enhances the achievement of the requisite profiles by providing for alternating revulets of second stream fluid and fluid in flow path 32. The initial mixing of the revulets at the match plane and the subsequent mixing at the rivulet boundary interface permit mixing to be accomplished in a shorter time and in a lesser flow distance than in previous prior art seperator systems, thence the lengthy expanse of duct associated with prior art devices need not be disposed between ejector 45 and diffuser 28. The use of mixer 45 in accordance with the present invention overcomes the penalties associated with these prior art devices.

Figure 3:
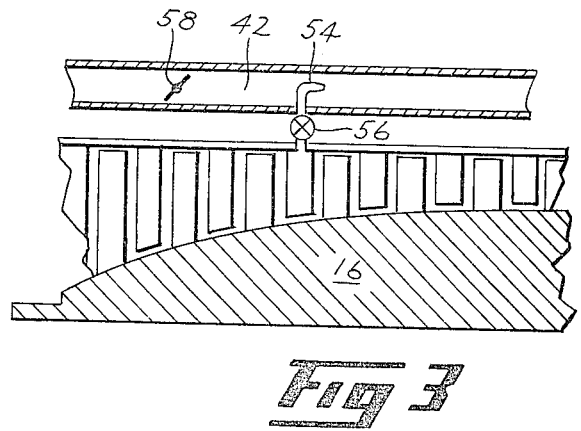
FIG. 3 depicts an embodiment of the present invention differing from the embodiment shown in FIGS. 1 and 2.

Turning now to other aspects of the present invention which should be appreciated, FIG. 3 depicts an embodiment supplementary to the embodiment depicted in FIG. 1. More specifically FIG. 3 depicts a schematic view of the compressor 16 depicted in FIG. 1 with an ejector 54 disposed in conduit 42 and operative in response to compressed air bled from compressor 16. The ejector 54 may be used in lieu of the ejector 46 powered by the expanded gases or may be used in supplement with ejector 46 to provide additional vacuum for drawing particles from collection chamber 40. Ejector 54 includes a control valve 56 for controlling the amount of air bled from compressor 16, and hence the flow of fluid through conduit 42, for improving the efficiency of the gas turbine engine 10. Ejector 54 may also be used to interrupt the flow of bleed air when the vehicle is in that part of its mission where foreign particle separation is unnecessary. Additionally, the present invention contemplates the use of a modulating valve 58 disposed in conduit 42 for the purposes of modulating the flow of air through conduit 42, thereby increasing the efficiency of the gas turbine engine 10. Modulating valve 58 may also be employed to interrupt the flow of air through conduit 42 when particle separation is not required, such as at high altitude environments.

While the preferred embodiments of the present invention have been described and depicted, it will be appreciated by those skilled in the art that modifications, substitutions and changes may be made thereto without departing from the scope of the invention as set forth in the appended claims. By way of example, the specific mixer depicted herein is of the lobed or chute type but it should be understood that the mixing means embraced by the present invention may include vortex generators, injection mixers, turbulence enhancers and other devices and structures which seek to enhance the mixing of a first fluid stream with a second fluid stream into which the first stream is introduced.

What is claimed is:

1. In a gas turbine engine having an inlet, a compressor, a combustor, and a turbine operatively connected to form a primary flow path means in which a gaseous flowing stream of fluid is compressed, combusted, and expanded, an inlet particle separator system comprising:

particle separating means disposed proximate said inlet for removing foreign particles from the primary flow path;

conduit means connected to said particle separating means for receiving (said) particles removed from the primary flow path by said particle separating means;

ejector means operatively connected to said conduit means to effect a flow of a second gaseous stream of fluid in said conduit for drawing said particles through said conduit means away from said particle separating means; and mixing means disposed proximate said ejector means (and) downstream of said turbine and (in fluid communication with said conduit means for receiving said second stream of fluid and for mixing said second stream of fluid with said stream of fluid flowing in said primary flow path) comprising means for axially directing said stream of fluid flowing in said primary flow path means aft of said turbine, and a plurality of axially and radially extending chutes disposed circumferentially about said primary flow path means and in fluid communication with said conduit means for receiving said second gaseous stream of fluid including contained particles therefrom and discharging said second stream of fluid into said stream of fluid flowing in the primary flow path in a plurality of discrete rivulets.

2. The system as set forth in claim 1 wherein said ejector means is operative in response to expansion of said (expanded) stream of fluid flowing in the primary flow path.

3. The system as set forth in claim 1 wherein said ejector means includes first and second ejectors operative, respectively, in response to expansion of said (expanded) stream of fluid and compression of said (compressed) stream of fluid flowing in the primary flow path.

4. The system as set forth in claim 1 wherein said ejector means is operative in response to compression of said (compressed) stream of fluid flowing in the primary flow path.

5. The system as set forth in claim 1 further comprising modulating means for modulating the flow of said second gaseous stream of fluid through said conduit means.

6. The system as set forth in claim 1 wherein said mixing means (discharges said second stream into said primary flow path in a plurality of discrete rivulets) further comprises a second plurality of axially and radially extending chutes interspersed between the chutes of the first-mentioned plurality of chutes for directing flow of discrete rivulets of fluid flowing in the primary flow path past the ends of said first-mentioned plurality of chutes and between the discrete rivulets of said second gaseous stream of fluid discharged into the primary flow path through said first-mentioned plurality of chutes.

* * * * *

UNITED STATES PATENT AND TRADEMARK OFFICE
CERTIFICATE OF CORRECTION

PATENT NO. : 4,265,646

DATED : May 5, 1981

INVENTOR(S) : Barry Weinstein and William Steyer

It is certified that error appears in the above-identified patent and that said Letters Patent are hereby corrected as shown below:

Column 5, line 38, delete "(said)"

Column 5, line 47, delete "(and)"

Column 5, line 47, delete "(in fluid com-"

Column 6, lines 1 - 4, delete "munication with said conduit means for receiving said second stream of fluid and for mixing said second stream of fluid with said stream of fluid flowing in said primary flow path)"

Column 6, line 18, delete "(expanded)"

Column 6, line 22, delete "(ex-"

Column 6, line 23, delete "panded)"

Column 6, line 23, delete "(com-"

Column 6, line 24, delete "pressed)"

Column 6, line 28, delete "(compressed)"

Column 6, lines 35 - 36, delete "(discharges said second stream into said primary flow path in a plurality of discrete rivulets)"

Signed and Sealed this

Twenty-fifth Day of August 1981

[SEAL]

Attest:

GERALD J. MOSSINGHOFF

Attesting Officer

Commissioner of Patents and Trademarks